(12) United States Patent
Hauge

(10) Patent No.: US 7,073,404 B2
(45) Date of Patent: Jul. 11, 2006

(54) METHOD AND DEVICE FOR DETECTING ACCUMULATIONS OF SOLID MATERIAL

(75) Inventor: Espen Hauge, Oslo (NO)

(73) Assignee: Vetco Aibel AS, Billingstad (NO)

( * ) Notice: Subject to any disclaimer, the term of this patent is extended or adjusted under 35 U.S.C. 154(b) by 117 days.

(21) Appl. No.: 10/740,522

(22) Filed: Dec. 22, 2003

(65) Prior Publication Data
US 2004/0129093 A1  Jul. 8, 2004

(30) Foreign Application Priority Data
Dec. 23, 2002 (NO) .................................. 20026192

(51) Int. Cl.
*G01F 23/22* (2006.01)
(52) U.S. Cl. ........................... 73/865.8; 73/295
(58) Field of Classification Search .............. 73/61.63, 73/61.65, 61.71, 61.74, 61.73, 865.8, 295; 374/45; 324/693
See application file for complete search history.

(56) References Cited
U.S. PATENT DOCUMENTS
4,912,977 A * 4/1990 Hope ........................ 73/295
4,967,593 A * 11/1990 McQueen ................... 73/295

FOREIGN PATENT DOCUMENTS

| CA | 2041479 A | 10/1992 |
|---|---|---|
| DE | 4013224 A | 10/1990 |
| JP | 7159220 A | 6/1995 |
| NO | 875024 | 4/1990 |
| NO | 894368 | 5/1991 |
| NO | 169622 C | 7/1991 |
| WO | 1083080 A | 9/1967 |
| WO | WO 9008304 A1 | 7/1990 |

* cited by examiner

*Primary Examiner*—Robert Raevis
(74) *Attorney, Agent, or Firm*—Venable LLP; Eric J. Franklin

(57) ABSTRACT

A method and device for detecting an accumulation of a solid material in a vessel that contains at least one fluid phase. The device includes an electric conductor element that is positioned in a region inside the vessel where the accumulation is likely to occur, the electric resistance of the conductor element being a function of the temperature thereof, elements for providing electrical power to the conductor element and elements for repeatedly measuring the electrical resistance of the conductor element.

12 Claims, 2 Drawing Sheets

METHOD AND DEVICE FOR DETECTING ACCUMULATIONS OF SOLID MATERIAL

CROSS-REFERENCE TO RELATED APPLICATIONS

This application claims priority from Norwegian patent application 2002 6192 filed 23 Dec. 2002.

TECHNICAL FIELD

The present invention relates to a method of detecting an accumulation of a solid material inside a vessel that contains at least one fluid phase.

It also relates to a device for detecting an accumulation of a solid material in a vessel that contains at least one fluid phase.

The invention is particularly advantageous in, though not restricted to, applications of oil and gas production and processing, in which an amount of sand accumulates on the bottom of, in such applications, existing gravity separators for the separation of water from oil. Thus, the fluid phase is mainly a liquid phase.

BACKGROUND OF THE INVENTION

In the oil and gas industry it is necessary to be able to record different states in the process in order to suitably control the process. In connection to the separation of water, gas and sand from oil in gravity separators, the sand will normally accumulate as one or more heaps or a layer or bed at the bottom of the separator tank as a result of gravitational settling.

In order to control the conditions in the separator tank by controlling the amount of sand gathered at the bottom thereof some kind of measurement or estimation of the amount as well as the distribution of sand is required.

U.S. Pat. No. 4,912,977 discloses a device for position determination of transition zones between at least two different enclosing media. More specifically it discloses a measuring device arranged for determination of the vertical distribution of one or more media which have a thermal connection with the device and where the positions of the interfaces can be determined on the basis of differences in thermal states and properties, comprising an arrangement of one or more thermal conductor elements, which have a common thermal reference element and discrete, chiefly thermally insulated sensor areas which have good thermal contact with the medium, being measured through a common partition wall which affords sufficient physical and thermal separation, as well as means for keeping the reference element at a temperature level different from the medium being measured. The temperature sensing elements may be composed of a thermopile, the thermal stress of which generates a voltage that is transmitted to a signal processor for further analysis.

However, this prior art device, though useful for determination of transition zones between for example oil, water, foam and gas in a gravity separator tank, is deemed to be rather complicated for the purpose of measuring the presence of a sand layer or sand heap at the bottom of such a tank. Also, for the purpose of covering a large area of the bottom of the tank, a plurality of such devices would be needed, further increasing the cost.

THE OBJECT OF THE INVENTION

It is an object of the present invention to present a method and a device by means of which an accumulation of sand or other solid material on the bottom of a vessel containing any fluid, such as oil and water or a combination thereof, can be detected.

It is a further object of the invention to present a method and a device that can detect whether the accumulation of sand or other solid material is in the form of an even layer on the vessel bottom or in the form of one or more discrete heaps.

It is a further object of the invention to present a method and a device by means of which it will be possible to estimate the total amount of accumulated sand or other solid material on the bottom of a vessel as described above.

BRIEF DESCRIPTION OF THE INVENTION

The object of the invention is achieved by means of the initially defined method, characterised in that that an electric conductor element is positioned in a region inside the vessel where the accumulation of the solid material is likely to occur, the electric resistance of the conductor element being a function of the temperature thereof, that electric power is supplied to the conductor element, and that the resistance of the conductor element is measured repeatedly.

The invention makes use of the fact that there is a very large difference in cooling efficiency between convective cooling of the conductor element via the fluid (i.e. the liquid phase), and conductive cooling of the conductor element via the accumulation of a heap or layer of solid material. Accordingly, the conductor element, or sensor, is fed with electric power and the current flowing through the conductor element at a given supply voltage can easily be measured as a representation of the resistance of the conductor element, which depends on the temperature thereof, which in its turn depends on the degree to which the conductor element is cooled by the fluid or the solid material. Preferably, the conductor element comprises one or more thermistors, for example NTC-thermistors, preferably arranged in a protective tube. The thermistors are preferably wired such that each individual thermistor can be individually powered and measured.

According to a preferred embodiment there are two or more conductor elements extending through said region at a given distance from each other and that the resistance of each conductor element is measured repeatedly and compared. Thereby it will be easier to determine the extent of the accumulation or deposition of solid material in the vessel than if only one such conductor element is provided. Preferably, a plurality of conductor elements are arranged in a pattern covering a substantial region in which detection is to be performed, each conductor element being supplied with electric power and the resistance of each conductor element repeatedly being measured. The measurements of each conductor element should be compared with previous measurements in order to detect changes in the amount of solid material along that specific conductor element.

Preferably, the effect of the electric power is chosen such that the temperature of the conductor element or conductor elements is substantially higher than the temperature of the fluid phase in said region of the vessel. Thereby, the difference between convection cooling and conductive cooling will be more distinct than if the temperature of said conductor(s) had been marginally higher than the temperature of the fluid phase.

According to another preferred embodiment of the present invention, the temperature of the fluid phase is intermittently measured by applying substantially lower electric power to the conductor element than during measurement for detection of solid materials accumulation, and the measurement of the temperature of the fluid phase is performed between measurements for detection of accumulations of solid materials.

According to a further preferred embodiment of the present invention, the vessel is supplied with a mixture of oil, water and sand from an oil well. The solid particles include sand, some of which follows the flow of water and accumulate on the bottom of the vessel by gravitational settling.

The object of the invention is also achieved by means of the initially defined device, characterised in that it comprises an electric conductor element that is positioned in a region inside the vessel where the accumulation is likely to occur, the electric resistance of the conductor element being a function of the temperature thereof, and that it comprises means for providing electrical power to the conductor element and means for measuring the electrical resistance of the conductor element.

Preferably, the device comprises two or more conductor elements extending through said region at a given distance from each other, and that it comprises means for providing each conductor element with electrical power and means for measuring the resistance of each individual thermistor within each conductor element.

According to another embodiment, the device includes a plurality of conductor elements that are arranged in a pattern covering a substantial region in which detection is to be performed and elements for providing each conductor element with electrical power and elements for measuring the resistance of each conductor element.

According to a further embodiment, the device includes elements for measuring the temperature of the fluid phase in or adjacent to said region.

According to yet another embodiment, the conductor element is arranged to be in direct contact with the surrounding medium that comprises the fluid phase or the accumulation of solid material.

According to another embodiment, the vessel is a gravity separator, the fluid phase includes oil and water from an oil well, and the solid material includes solid particles, mainly sand.

BRIEF DESCRIPTION OF THE DRAWINGS

Hereinafter, a preferred embodiment will be described by way of example with reference to the accompanying drawings on which.

DETAILED DESCRIPTION OF THE INVENTION

Figure 1:
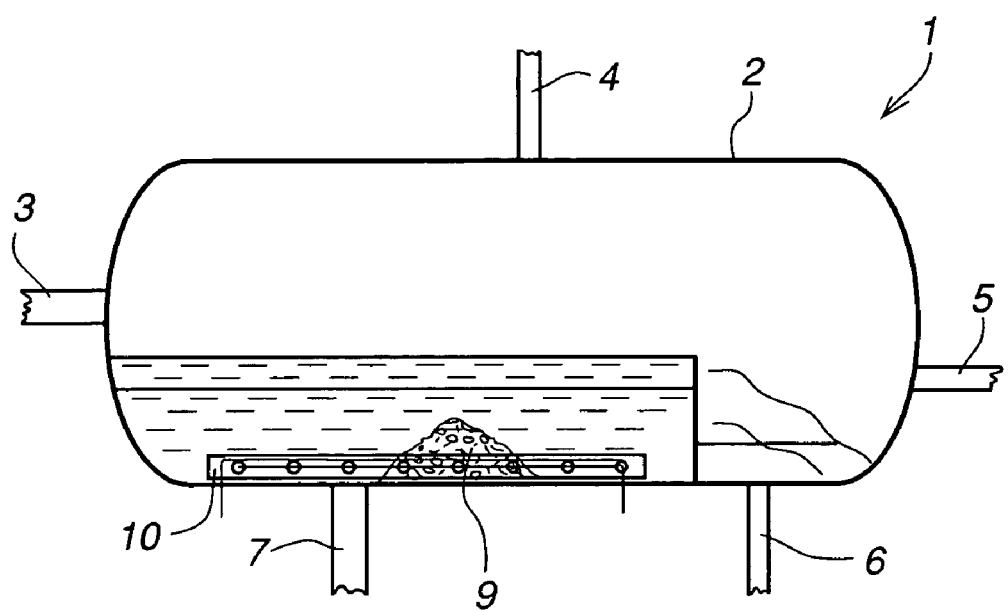
FIG. 1 is a schematic view of a gravity separation tank equipped with a detecting device according to an embodiment of the invention.

In FIG. 1, a device according to the invention is provided in a gravity separator 1 of the kind used in the petrochemical industry for the separation of water and gas from oil that has been produced from an oil well.

The separator 1 defines a vessel or tank 2 provided with an inlet 3 and separate outlets 4–6 for gas, oil and water respectively. It also comprises an outlet 7 for sand or other particulate, solid material that follows the oil and water from the well and accumulates at the bottom of the separator 1 due to the gravitational force. A heap of sand 9 is indicated in FIG. 1. Typically, the vessel is a cylindrical vessel with a length of approximately 10 m and width of approximately 3 m. However, the invention is not restricted to such vessel dimensions.

The device according to the invention comprises a plurality of conductor elements 10 each of which extends through the interior of the tank at a pre-determined distance from and in parallel with the bottom wall of the tank 2. The conductor elements 10 are arranged in a pattern such that they cover a region in which accumulation of sand is likely to occur during operation of the separator. Here, the conductor elements 10 are arranged in parallel with each other with a given spacing, and extend in the length direction of the tank. Typically, in a vessel with the mentioned dimensions, the area needed to be covered or monitored by means of the inventive device is approximately 8×1 m. The distance between conductor elements 10 and bottom floor is governed by the size or height of the sand heaps that need to be detected, for instance about 3 cm high. Accordingly, in such a case, the distance between conductor elements 10 and bottom floor should be less than 3 cm.

Figure 2:
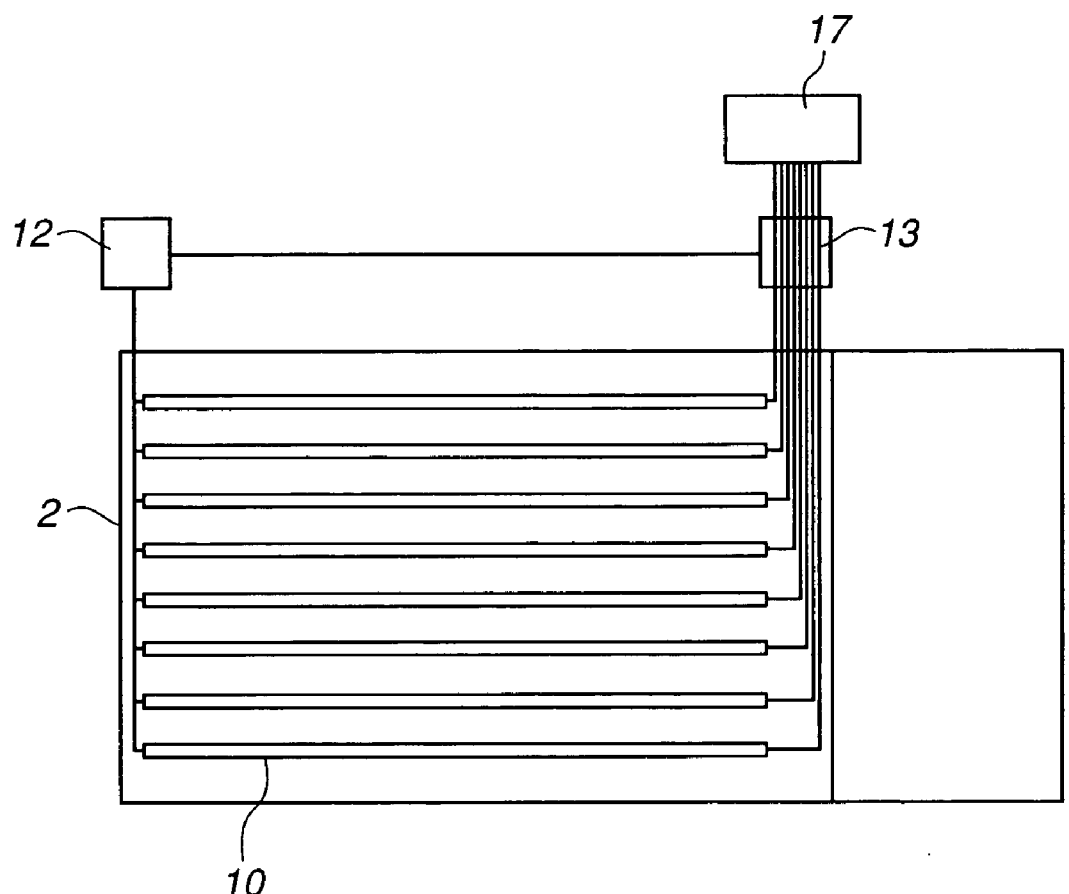
FIG. 2 is a perspective view showing a pattern of conductor elements according to the embodiment in FIG. 1.

FIG. 2 is a perspective view showing an embodiment according to the invention. The device comprises a plurality of conductor elements 10 that are arranged in a pattern covering a substantial region in which detection is to be performed. The device further comprises means 12 for providing the conductor elements 10 with electrical power and means 13 for measuring the resistance (as a function of the temperature) of each conductor element 10. The conductor elements and measuring means 13 are connected to an evaluation unit 17 for determination of the amount and/or the distribution of accumulated solid material on the bottom of the vessel 2.

Figure 3:
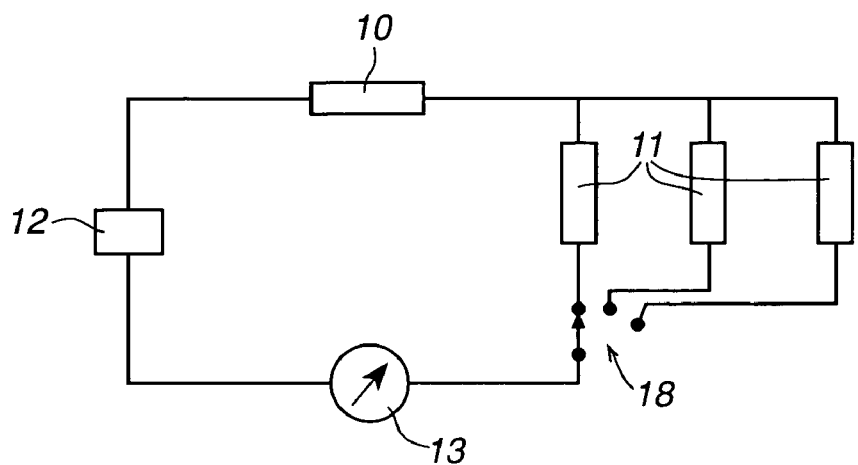
FIG. 3 is a schematic representation of the means for measurement of the resistance of a conductor element according to an embodiment of the invention.

In FIG. 3 a circuit diagram is schematically shown representing an embodiment according to the invention. Each conductor element 10 may here comprise at least one thermistor 11 that is connected to a means 12 such as a battery for supply of electric power. In series with the conductor element 10 there is also provided a means 13, here an ampere meter, for indirect measurement of the electric resistance of the conductor element 10 by measuring the current through the conductor element 10. If a multitude of thermistors is used (3 thermistors are sketched in FIG. 3, but any number of thermistors can be used), then a switch selector 18 is used to select which one is being measured. The conductor element 10 should be electrically insulated from the surrounding media. According to a preferred embodiment, the conductor element 10 is accommodated inside a tube or housing, that is made of a material that is resistant to the surrounding media and environment and that has a high coefficient of thermal conductivity. For example, in a gravity separator for separating water from oil, such a tube or housing may comprise an alloy like Inconel or any alloy with corresponding properties. The conductor element 10 should be electrically insulated in relation to such a tube, for example by being embedded in oil inside the tube. However, it is important that also the electric insulation has a high coefficient of thermal conductivity. The suggested oil immersion will rapidly convect any heat from the thermistor 11 to the wall of the tube 14.

Figure 4:
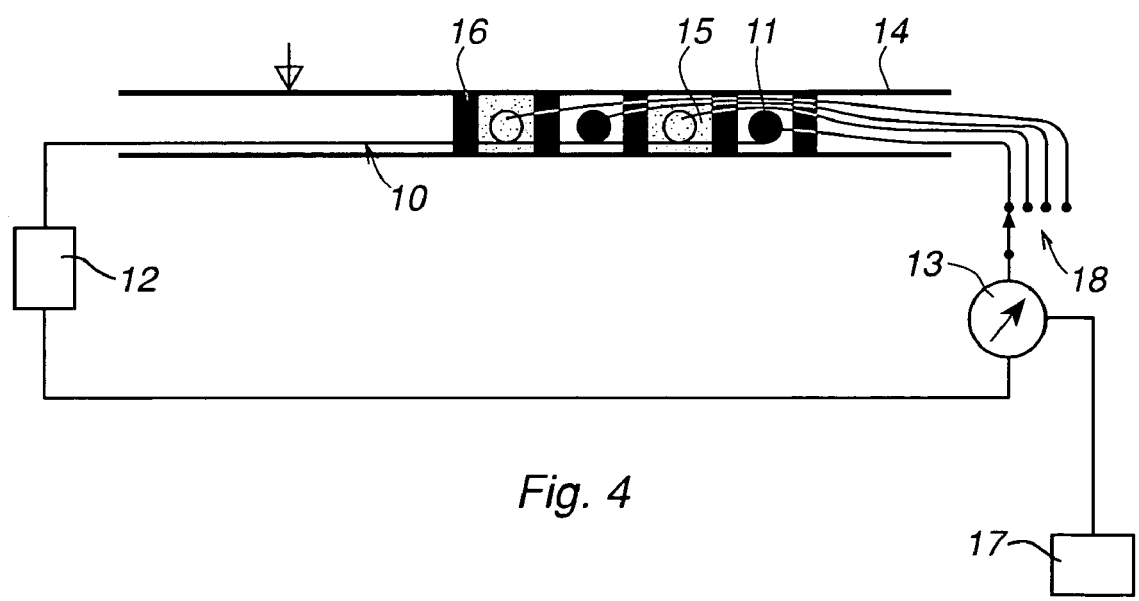
FIG. 4 is a schematic representation of a preferred embodiment of an individual conductor element according to the invention.

In FIG. 4 there is shown a plural element embodiment in which each conductor element 10 comprises a plurality of discrete thermistors, preferably NTC-thermistors 11. These are arranged at a pre-determined distance from each other inside a tube 14 made of a material such as has been described above. Each thermistor 11 is electrically, though not thermally, insulated from the surrounding tube 14 by means of oil 15 in the tube 14. Individual thermistors 11 are arranged in separate cells by means of partition walls 16 arranged at predetermined distance intervals in the tube 14. Preferably, the partition walls 16 comprise a heat insulating material such as rubber or any suitable polymer. The NTC-thermistors are wired such, that each individual thermistor can be connected to the circuit via a selector switch 18 at the one side making it possible to address one thermistor at a time, while the thermistors are connected to each other at a common point on the other side. In series with the set of thermistors 11 and the selector switch 18, there is arranged an ampere meter 13 like the ampere meter described above in order to permit continual measurement of the current through the conductor element 10, and thereby of the resistance of the set of conductor elements 11, with due regard to the resistance contribution of the connecting wires or leads in the conductor element.

Each thermistor 11 is characterised in that the electrical conductivity thereof is dependent or even highly dependent on the temperature of the conductor element 10. For each thermistor 11 the dissipated power is almost independent of the temperature, while the current through it is depending on the temperature. Typically each thermistor 11 is a NTC-thermistor the electrical resistance of which alters with approximately 2 k$\Omega$/25° C. However, other similar thermistors are also within the inventive concept.

During operation, the power supplied to the conductor elements 10 is such that the temperature of the conductor elements 10 is substantially higher than that of the surrounding media. For example, a conductor temperature of approximately 200° C. above the temperature of the water in the bottom region of a separator vessel is suitable.

If the temperature of the surrounding medium is expected to vary, then this can be detected by supplying a small amount of power to the conductor element 10.

For an embodiment as the one shown in FIG. 4 in which the conductor element 10 includes a plurality of thermistors 11, for example arranged in a tube in a vessel 2 as described above, the following principal measurement cycle is preferred:

Step 1: supply low power (e.g. 0.1 mW) through the conductor 10 to each thermistor 11 in turn, in order to estimate the temperature of the surrounding medium in the vessel 2. Note that the surrounding medium might be either of the kind that transfers heat from the tube 14 by convection or the kind that transfers heat from the tube 14 by conduction, in this case either water or sand respectively. The power is sufficiently low to heavily reduce the impact of different heat transfer phenomena. The conductor 10 should, of course, be pre-calibrated in a medium of known temperature in order to permit precise temperature estimation in step 1. The temperature of the surrounding medium at each thermistor 11 is calculated based on the measured current in the conductor 10.

Step 2: supply high power (e.g. 100 mW) through the conductor 10 to each thermistor in turn. The power should be high enough to permit the thermistors 11 to be considerably heated if they are buried in a medium that transfers heat from the tube 14 or conductor element 10 by conduction cooling rather than convective cooling. In this case, since zones of the conductor element 10 surrounded by water will not heat up much, but zones buried in sand will, the temperature, and thereby the total resistance of the conductor element (the thermistor) will be a relevant measure of the amount of sand covering the conductor element. The resistance of the individual thermistors further gives information about the sand distribution.

Step 3: let the thermistors 11 and the conductor 10 cool off, and repeat cycle.

For an embodiment including a plurality of individual conductor elements, as indicated in FIGS. 1 and 2, the conductor elements and measuring equipment (ampere meters) should be connected to an evaluation unit 17 for determination of the total amount and/or the distribution of accumulated solid material on the bottom of the vessel 2. The evaluation unit may be part of or connected to a control unit for controlling the operation of the separation vessel 2, for example for controlling emptying of sand out of the vessel 2 via a sand outlet 7.

It should be realised that the above presentation of the invention has been made by way of example, and that alternative embodiments will be obvious for a person skilled in the art without going beyond the scope of protection as claimed in the annexed patent claims supported by the description and the annexed drawings.

For example, the geometry of the individual conductor elements may be other than the one suggested here. Likewise, the material of the housing or tube 14 may be any one suitable for the purpose of covering and protecting the conductor elements 10. Also, other electrical insulators than oil are possible for the purpose of insulating the thermistor 1 from the tube 14.

The invention claimed is:

1. A method of detecting an accumulation of a solid material inside a vessel that contains at least one fluid phase, comprising:
    positioning an electric conductor element in a region inside the vessel where the accumulation is likely to occur, the electric resistance of the conductor element being a function of the temperature thereof,
    supplying electric power to the conductor element,
    repeatedly measuring the resistance of the conductor element, and
    comparing the measurements.

2. The method according to claim 1, wherein there are two or more conductor elements extending through said region at a given distance from each other and wherein the resistance of each conductor element is measured repeatedly.

3. The method according to claim 2, wherein a plurality of the two or more conductor elements are arranged in a pattern covering a substantial region in which detection is to be performed.

4. The method according to claim 2, wherein the effect of the electric power is chosen such that the temperature of at least one of the at least two conductor elements is substantially higher than the temperature of the fluid phase in said region of the vessel.

5. The method according to claim 1, wherein the temperature of the fluid phase is intermittently being measured by applying substantially lower electric power to the conductor element than during measurement for detection of solid materials accumulation, and wherein the measurement of the temperature of the fluid phase is performed between measurements for detection of accumulations of solid materials.

6. The method according to claim 1, wherein the vessel is supplied with a mixture of oil, water and sand from an oil well, and that said solid particles comprises sand, some of which follows the flow of water and accumulate on the bottom of said vessel by gravitational settling.

7. A device for detecting an accumulation of a solid material in a vessel that contains at least one fluid phase, comprising:
   an electric conductor element that is positioned in a region inside the vessel where the accumulation is likely to occur, the electric resistance of the conductor element being a function of the temperature thereof,
   means for providing electrical power to the conductor element, and
   means for repeatedly measuring the electrical resistance of the conductor element and comparing the measurements.

8. The device according to claim 7, wherein it comprises two or more conductor elements extending through said region at a given distance from each other and wherein it comprises means for providing each conductor element with electrical power and means for measuring the resistance of each conductor element.

9. The device according to claim 7, wherein it comprises a plurality of conductor elements that are arranged in a pattern covering a substantial region in which detection is to be performed and means for providing each conductor element with electrical power and means for measuring the resistance of each conductor element.

10. The device according to claim 7, wherein it comprises a means for measuring the temperature of the fluid phase in or adjacent to said region.

11. The device according to claim 7, wherein the conductor element is arranged to be in direct contact with the surrounding medium that comprises said fluid phase or the accumulation of solid material.

12. The device according to claim 7, wherein the vessel is a gravity separator, the fluid phase comprises oil and water from an oil well, and wherein the solid material comprises solid particles, mainly sand.

* * * * *